Jan. 18, 1938.  M. C. HUFFMAN  2,105,491
LUBRICATING APPARATUS
Filed Dec. 3, 1934

Inventor:
Mervin C. Huffman
by
Louis A. Maxon
Atty.

Patented Jan. 18, 1938

2,105,491

UNITED STATES PATENT OFFICE 2,105,491

LUBRICATING APPARATUS

Mervin Chester Huffman, Claremont, N. H., assignor to Sullivan Machinery Company, a corporation of Massachusetts Application December 3, 1934, Serial No. 755,723

26 Claims. (Cl. 184—55)

My invention relates to lubricating apparatus, and more particularly to lubricating apparatus for use in air lines.

In the lubrication of rock drilling motors and similar devices it is desirable to provide for positive supply of lubricant in appropriate quantity through the air line; and where a lubricator is to be used for the lubrication of but a single drilling motor which may be shut down for substantial periods at a time, it is desirable that means be provided for preventing discharge of lubricant during the periods when the drilling motor is inactive. However, at other times where a single lubricator may be used to supply lubricant to a number of drilling motors some one or another of which will be operating about all the time, or when the device to be lubricated is to operate continuously for long periods, it may be possible to dispense with devices for interrupting lubricant supply whenever air flow is discontinued. It is, furthermore, possible, even where lubricant would be supplied positively during all times when air pressure is upon a line, to prevent the loss of lubricant when air is not required, by suitably venting the line at or short of the lubricator when flow therethrough is not desired.

It is an object of my invention to provide an improved lubricator. It is another object of my invention to provide an improved lubricator for positively supplying to an air or other motive fluid conducting line an appropriate quantity of lubricant. It is a further object of my invention to provide an improved lubricating apparatus for providing an appropriate quantity of lubricant to an air line whenever there is a flow of motive fluid through the line. It is still another object of my invention to provide an improved lubricator for positively supplying lubricant in appropriate quantity to an air or other motive fluid line during flow through the latter, having improved means for interrupting lubricant admission to the line when flow therethrough is discontinued. It is still another object of my invention to provide an improved lubricator of the type in which the lubricant storage chamber surrounds a passage through which the motive fluid for a device to be lubricated, passes. It is still another object of my invention to provide an improved lubricator for a motive fluid line in which positive lubricant supply at a pressure in excess of that flowing in the line, may be available, instead of relying upon Pitot tubes or the like to effect flow of the lubricant into the line. Other objects and advantages of the invention will hereinafter more fully appear.

In the accompanying drawing, in which one embodiment which the invention may assume in practice, and a modification, are shown for purposes of illustration, Fig. 1 is a central, longitudinal, vertical section through a lubricator constructed in accordance with the preferred embodiment of the invention;

Figure 1:
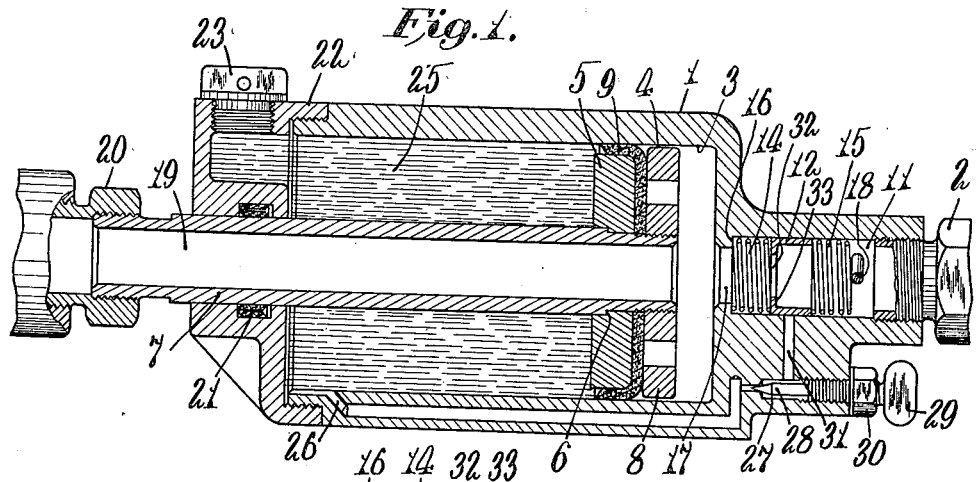
Figure 2:
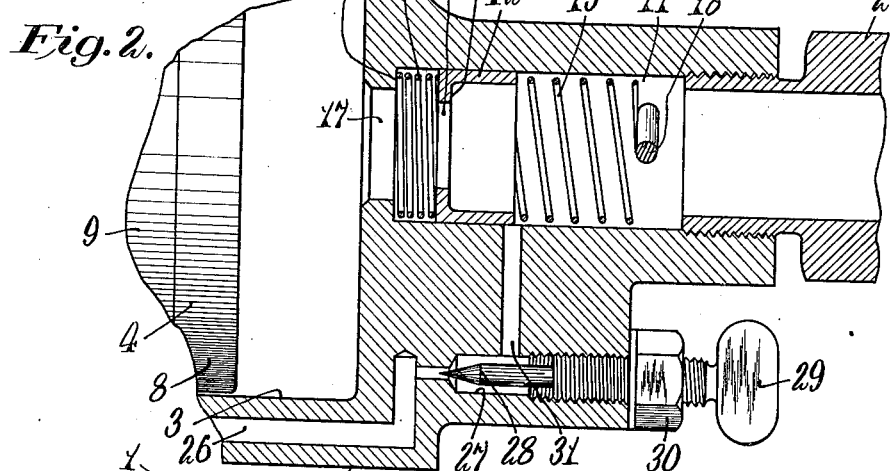
Fig. 2 is an enlarged fragmentary section on the same plane as Fig. 1 showing parts in different position.

Referring first to Figs. 1 and 2 of drawing, it will be observed that a casing member 1 has at one end thereof a connection 2 which is a terminal connection at the end of a hose or the like, leading from a source of motive fluid. The casing 1 has a chamber 3 therein within which a piston 4 is reciprocable. The piston comprises a plate 5 seated against a shoulder 6 upon a hollow piston rod 7, a follower plate 8 threadedly engaging the end of the rod 7, and an intermediate cup packing 9 which is arranged to preclude leakage between the wall of the cylinder 3 and the piston in a direction toward the supply connection 2. The supply connection 2 communicates with the chamber 3 through a passage 11 within which there is reciprocably mounted a hollow valve member 12, said valve member being normally held, when there is no flow of air through the passage 11, in a predetermined position by means of springs 14 and 15 engaging its opposite ends and respectively reacting against a shoulder 16 surrounding a passage 17 through which the passage 11 and chamber 3 are brought into communication, and against a transverse pin 18. The piston rod 7 is traversed by passage 19 and carries at its outer end a connector member 20 which is mounted on the end of a line leading to a drilling motor or the like. A suitable packing 21 arranged in a head member 22 of the casing 1, prevents leakage along the outside of the piston rod 19. The head member 22 is provided with a removable filler plug 23 through which lubricant can be supplied to the space within the chamber 3 between the head 22 and the adjacent side of the piston 4. The lubricant within the chamber is indicated at 25. A passage 26 communicating with the bore 3 adjacent the head 22 extends longitudinally toward the opposite end of the casing 1 where it enters a chamber 27 after passing a needle control valve 28, having suitable manual adjusting means 29 and a lock nut 30, which controls the flow from passage 26 to a passage 31, which communicates with passage 11 at a point which is normally covered, when there is no flow through the passage 11, by the valve 12. The valve 12 is traversed by an opening 32 through which flow may take place, said opening being both smaller than the cross-sectional area of the passage 11 and the cross-sectional area of the passage 17 so that air flowing through the passage 11 and passage 17 will act upon a shoulder 33 in the valve member 12 and effect a longitudinal movement of the valve 12.

The mode of operation of the embodiment of the invention just described will be readily understood. It will be appreciated that, at the drilling motor, not shown, and to which the lubricator is connected through a fluid conductor terminating at the connecting device 20, there will be a throttle valve, by means of which a drill runner can interrupt flow of fluid to the motor. It will be further understood that there may be provided a suitable shut-off valve in the pressure fluid supply line which connects at 2 to the lubricator casing 1. Let it be assumed that the valve last mentioned is wide open but that the throttle valve of the hammer motor is closed. It will then be evident that air at operating pressure, say 100 lbs. per square inch, will fill the passage 11, the space within the chamber 3 to the right of the piston in Fig. 1, the bore 19 of the piston rod 7, and the connection to the drilling motor completely up to the throttle valve of the latter. Accordingly, there will be a pressure acting upon the lubricant 25 and tending to effect flow of the latter through the connection 26, past the valve 28, through the chamber 27 and passage 31 into the passage 11, but such flow will be prevented by the valve 12 which, when no flow is occurring through the lubricator, will occupy the position shown in Fig. 1. Due to the greater piston area exposed to pressure in chamber 3, as compared with that contacted by the lubricant, the lubricant pressure will exceed the air pressure Now let it be assumed that the operator opens the throttle valve of the drilling motor, and it will be apparent that flow will immediately begin to take place through passage 11, passage 17, chamber 3, passage 19, and on to the drilling motor. As a result of the rush of air the valve 12 will be shifted to the left, compressing the spring 14, and will uncover the passage 31, and lubricant will then flow, since the pressure to which the lubricant 25 is subjected is, as above explained, greater than the pressure within the passage 11, at such a rate as is permitted by the adjustment of the needle valve 28, into the passage 11, and be carried on with the flowing air to the drilling motor, passing through the passage 19, the connection 20, and the supply line (not shown) to the drilling motor. As soon as the operator closes down his throttle, the flow of air will cease, and the valve 12 will return from the position shown in Fig. 2 to the closed position as shown in Fig. 1, and there remain until the air is again turned on at the drilling motor or other point of use. Refilling will be effected by relieving the pressure to the right of piston 4, forcing the latter to right-hand extreme position, and pouring in lubricant through the filler opening. A three-way valve closing the supply to passage 11 and simultaneously venting the latter would be advantageous in facilitating the refilling operation.

It will be evident that in this form of my invention I have provided a very simple lubricator, one which is altogether independent in its operation of any position which it may assume, which because of the position of the mouth of the passage 26 will discharge all of the lubricant which it contains if demand is made therefor, which does not have to depend upon reductions in pressure produced by Pitot tubes, venturis, or the like, for operation, and yet, withal, one which, notwithstanding that it maintains the lubricant constantly under pressure whenever the air line is under pressure, and so ready for immediate delivery upon starting the motor, prevents waste of lubricant through flow into the air line during the time when no demand for air exists.

Figure 3:
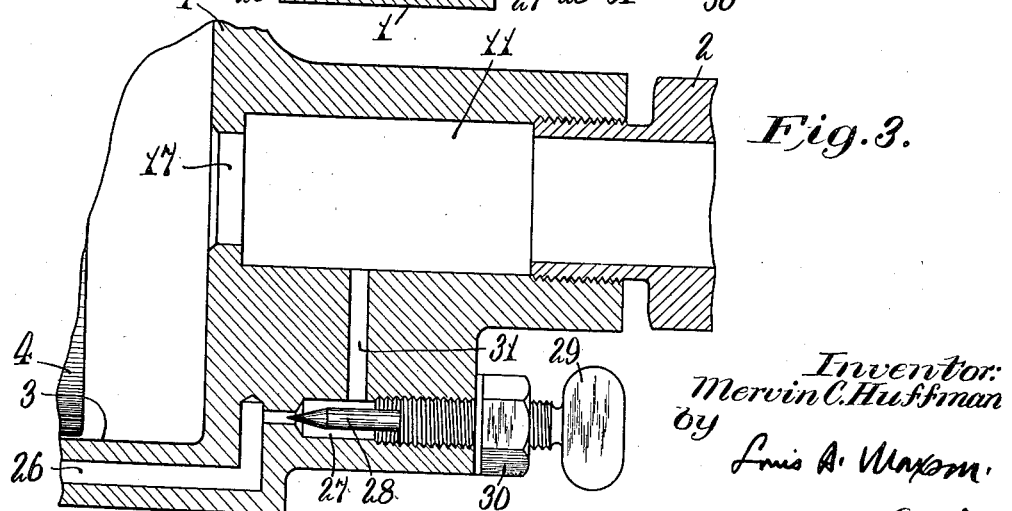
Fig. 3 is another sectional view on a plane corresponding to that of Figs. 1 and 2 showing a modified construction.

In the modification shown in the fragmentary view of Fig. 3, it will be observed that the valve 12, the springs 14 and 15 and the pin 18 have been omitted, and accordingly that there will be a constant discharge of lubricant through the passage 26, past the needle valve 28, through the chamber 27 and connection 31, into the chamber 11 at all times when air pressure exists in the line 11. Such an arrangement, while lacking some of the advantages of the embodiment of the invention first described, may advantageously be used where a lubricant is to be supplied to a plurality of drills or other utilizers of motive fluid, or to one air-user which operates uninterruptedly for long periods; and may be used also with a single drill provided the throttle valve or some other suitable shut-off valve be arranged at a point further from the drilling motor than the lubricator proper, i. e., ahead of the lubricator. For example, if it were desired to mount the lubricator in a small size directly on the drilling motor, and to provide the throttle at the side thereof remote from the drilling motor, this arrangement would be practical and advantageous. Again it would be desirable and advantageous if there were employed a shut-down valve between the source of pressure supply and the drilling motor of such a type that when supply of air to the drilling motor was no longer desired, the shut-off valve would be closed and the pressure within the lubricator simultaneously vented. Of course, unless the drill throttle valve were closed the pressure would fall in any event, but in the event that the throttle valve for the motor were to be closed and the device shown in Fig. 3 used to supply pressure to a single motor, it would be advisable to use a 3-way stop valve so that the chamber 3 would be vented to atmosphere when no air was required at the drilling motor. It will be appreciated, furthermore, by those skilled in the art that situations where an entire charge of lubricant would be used at so nearly a steady rate that it would be unnecessary to employ the automatic control of Fig. 1, are common, and in one or the other of the embodiments shown my invention is calculated adequately and efficiently to supply lubricant to meet any conditions.

While I have in this application specifically described one form which my invention may assume in practice, and a certain modification thereof, it will be understood that this form of the same is shown for purposes of illustration, and that the invention may be further modified and embodied in various other forms without departing from its spirit or the scope of the appended claims.

What I claim as new and desire to secure by Letters Patent is:

1. In an air line lubricator, a cylinder, a piston therein, said piston having a hollow piston rod extending through an end of the cylinder, said cylinder having a connection for the admission of air thereto at its other end and said piston rod having provision for the delivery of air at its outer end, whereby an air stream may flow from end to end through the lubricator, the space in the cylinder surrounding the piston rod constituting a lubricant reservoir, and means for conducting lubricant from said space to an air stream flowing through said lubricator.

2. In an air line lubricator, a cylinder, a piston therein, said piston having a hollow piston rod extending through an end of the cylinder, said cylinder having a passage constituting a connection for the admission of air thereto at its other end and said piston rod having provision for the delivery of air at its outer end, whereby an air stream may flow from end to end through the lubricator, the space in the cylinder surrounding the piston rod constituting a lubricant reservoir, and means for conducting lubricant from said space to an air stream flowing through said lubricator communicating with said passage.

3. In an air line lubricator, a cylinder, a piston therein, said piston having a hollow piston rod extending through an end of the cylinder, said cylinder having a passage constituting a connection for the admission of air thereto at its other end and said piston rod having provision for the delivery of air at its outer end, whereby an air stream may flow from end to end through the lubricator, the space in the cylinder surrounding the piston rod constituting a lubricant reservoir, means for conducting lubricant from said space to an air stream flowing through said lubricator, communicating with said passage, and means in said passage for obturating said conducting means when no air flow is taking place.

4. In an air line lubricator, a cylinder, a piston therein, said piston having a hollow piston rod extending through an end of the cylinder, said cylinder having a connection for the admission of air thereto at its other end and said piston rod having provision for the delivery of air at its outer end, whereby an air stream may flow from end to end through the lubricator, the space in the cylinder surrounding the piston rod constituting a lubricant reservoir, means for conducting lubricant from said space to an air stream flowing through said lubricator, and air flow controlled means for controlling said conducting means.

5. In an air line lubricator, a cylinder, a piston therein, said piston having a hollow piston rod extending through an end of the cylinder, said cylinder having a connection for the admission of air thereto at its other end and said piston rod having provision for the delivery of air at its outer end, whereby an air stream may flow from end to end through the lubricator, the space in the cylinder surrounding the piston rod constituting a lubricant reservoir, means for conducting lubricant from said space to an air stream flowing through said lubricator, and a hollow valve responsive to air flow and having provision for the flow of air therethrough for controlling said conducting means.

6. In a lubricator for a pressure fluid supply line, a casing having at one end a passage constituting a fluid supply connection, within the casing a piston having a hollow pressure fluid conducting piston rod open from end to end, and at the other end of the casing a bore through which the rod extends, said casing providing between the piston and the last-mentioned casing end a lubricant reservoir, and means for conducting lubricant from a point near the last-mentioned end of the casing to said passage.

7. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last-mentioned casing end a lubricant reservoir, means for conducting lubricant from a point near the last-mentioned end of the casing to said passage, and a resiliently positioned valve in said passage for controlling flow from said conducting means.

8. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last-mentioned casing end a lubricant reservoir, means for conducting lubricant from a point near the last-mentioned end of the casing to said passage, and a resiliently positioned, hollow, pressure-fluid-flow-responsive valve in said passage for controlling flow from said conducting means into said passage.

9. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last-mentioned casing end a lubricant reservoir, means for conducting lubricant from a point near the last-mentioned end of the casing to said passage and having a mouth communicating with the latter, means for regulating the rate of flow through said conducting means, and means governed by pressure fluid passing through the casing for opening or closing the mouth of said conducting means.

10. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last-mentioned casing end a lubricant reservoir, means for conducting lubricant from a point near the last-mentioned end of the casing to said passage, and means including a hollow valve having springs acting upon the opposite ends thereof for controlling flow through said lubricant conducting means.

11. In a lubricator, means providing a lubricant reservoir, means providing a passage for conducting pressure fluid, means for creating a lubricant pressure in excess of the pressure of the pressure fluid in said passage, whether said pressure fluid be flowing or static in said passage, sure fluid be flowing or static in said passage, from said reservoir to said passage, and means for controlling said conducting means including a valve disposed in said passage and controlled by pressure fluid flow in said passage.

12. In a lubricator, means providing a lubricant reservoir, means providing a passage for conducting pressure fluid, means for creating a lubricant pressure in excess of the pressure of the pressure fluid in said passage, whether said pressure fluid be flowing or static in said passage, means for conducting lubricant at such pressure from said reservoir to said passage, and means for controlling said conducting means including a lubricant flow rate controlling valve and a lubricant flow interrupting valve, the latter having its position governed by flow in said passage.

13. In a lubricator, means providing a lubricant reservoir, means providing a passage for conducting pressure fluid, means including a piston subjected to the pressure in said passage for creating a lubricant pressure in excess of the pressure of the pressure fluid in said passage, whether said pressure fluid be flowing or static in said passage, means for conducting lubricant at such pressure from said reservoir to said passage, and means for controlling said conducting means including a valve governed by flow of pressure fluid in said passage and precluding lubricant delivery when there is no flow of pressure fluid in said passage.

14. In a lubricator, means providing a lubricant reservoir, means providing a passage for conducting motive pressure fluid, means including a piston coaxial with said passage for creating a lubricant pressure in excess of the pressure of the motive pressure fluid in said passage, whether said pressure fluid be flowing or static in said passage, at least one plane perpendicular to their common axial line cutting both said piston and said passage, means for conducting lubricant at such pressure from said reservoir to said passage, and means for controlling said conducting means.

15. In a lubricator, means providing a lubricant reservoir, means providing a passage for conducting pressure fluid, means for creating a lubricant pressure in excess of the pressure of the pressure fluid in said passage, whether said pressure fluid be flowing or static in said passage, means for conducting lubricant at such pressure from said reservoir to said passage, and means for controlling said conducting means including a valve movable longitudinally of said passage and governed by flow therethrough.

16. In a lubricator, mean providing a lubricant reservoir, means providing a passage for conducting motive pressure fluid, means for creating a lubricant pressure in said reservoir in excess of the pressure in said passage whenever said passage is under motive-pressure-fluid pressure, whether or not there be motive fluid flow through said passage, and means for conducting lubricant from said reservoir to said passage only when flow is occurring through the latter.

17. In a lubricator for a pressure fluid supply line, a casing having at one end a passage constituting a fluid supply connection, within the casing a piston having a hollow piston rod and at the other end of the casing a bore through which the rod extends, said casing providing between the piston and the last mentioned casing end a lubricant reservoir, means for conducting lubricant from a point near the last mentioned end of the casing to said passage, and means responsive to pressure fluid flow through said casing controlling said conducting means.

18. In an air line lubricator, a cylinder having heads, a piston in said cylinder, said piston having a hollow piston rod, said piston and piston rod being open from end to end and said cylinder having a connection for the admission of air therethrough at its end remote from the piston rod whereby a passage for conducting an air stream through the lubricator is provided, the space in the cylinder surrounding the piston rod constituting a lubricant reservoir, means for conducting lubricant from said space to said passage, and means in said passage for automatically controlling the ingress of lubricant thereto.

19. In a lubricator, a hollow casing providing a cylinder and having passage means formed therein and communicating with said cylinder, a piston in said cylinder having a piston rod open from end to end, said passage means, said cylinder and said hollow piston rod providing conjointly a passage for motive fluid to pass through said casing, said casing, piston and piston rod cooperating to form a lubricant reservoir surrounding said piston rod, and means for conducting lubricant from said reservoir to said passage.

20. In a lubricator for introducing lubricant into a line in which motive fluid flows, a casing, means for dividing the interior thereof into a lubricant reservoir and a motive fluid conducting passage through which motive fluid passes and for creating a pressure differential tending to produce flow from said reservoir to said motive fluid passage, between the space within the lubricant reservoir and the motive fluid passage within said casing when said passage is under motive fluid pressure, whether or not motive fluid flow is taking place in said passage, and means for delivering lubricant from said lubricant reservoir into said motive fluid conducting passage for entrainment by motive fluid while the latter is within said passage.

21. In a lubricator for introducing lubricant into a line in which motive fluid flows, a casing, means for dividing the interior thereof into a lubricant reservoir and a motive fluid conducting passage and for creating a pressure differential tending to produce flow from said reservoir to said motive fluid passage, between the space within the lubricant reservoir and the motive fluid passage within said casing when said passage is under motive fluid pressure, whether or not motive fluid flow is taking place in said passage, and means for delivering lubricant from said lubricant reservoir into said motive fluid passage for entrainment by motive fluid while the latter is passing through said lubricator, said lubricant delivering means having controlling means governed by motive fluid flow in said passage.

22. In a lubricator for introducing lubricant to a line in which motive fluid flows, a casing, means for dividing the interior thereof into a lubricant reservoir and a motive fluid conducting passage including means for creating a pressure differential tending to produce flow from said reservoir to said motive fluid passage, between the space within the lubricant reservoir and the motive fluid passage within said casing when said passage is under motive fluid pressure, whether or not motive fluid flow is taking place in said passage, and means for delivering lubricant from said lubricant reservoir into said motive fluid conducting passage for entrainment by motive fluid while the latter is within said passage.

23. In a lubricator for introducing lubricant to a line in which motive fluid flows, a casing, means for dividing the interior thereof into a lubricant reservoir and a motive fluid conducting passage including means for creating a pressure differential tending to produce flow from said reservoir to said motive fluid passage, between the space within the lubricant reservoir and the motive fluid passage within said casing when said passage is under motive fluid pressure, whether or not motive fluid flow is taking place in said passage, and means for delivering lubricant from said lubricant reservoir into said motive fluid passage for entrainment by motive fluid while the latter is passing through said lubricator, said lubricant delivering means having controlling means governed by motive fluid flow in said passage.

24. In a lubricator, a casing, means for dividing the interior thereof into a lubricant reservoir and a pressure fluid chamber including means for creating a pressure differential tending to produce flow from said reservoir, between the space within the lubricant reservoir and the space within the fluid chamber when the latter is under pressure, whether or not there be flow of pressure fluid through said chamber, means for introducing motive fluid into said chamber and means for conducting it out of said chamber for delivery to a point of use, so arranged that all the motive fluid with which lubricant is to be mixed passes through said chamber, and means for delivering lubricant from said lubricant reservoir into motive fluid passing through said lubricator.

25. In a lubricator, a casing having a movable partition for dividing the casing into a lubricant reservoir and a pressure fluid chamber, said chamber and reservoir variable in volume upon movement of said partition, said pressure fluid chamber increasing in volume as said reservoir decreases in volume and vice versa, and the pressure fluid in said pressure fluid chamber acting on said partition to maintain the lubricant in said reservoir under pressure in excess of pressure fluid chamber pressure regardless of its volume, a pressure fluid conduit connected to said casing and communicating with said fluid chamber, a pressure fluid conduit connected to said movable partition for movement therewith and likewise communicating with said pressure fluid chamber, and means for conducting a controlled flow of lubricant from said reservoir to said pressure fluid chamber.

26. In a lubricator, a cylinder having heads, one formed with a motive fluid supply connection and the other with a bore for receiving a piston rod, a piston reciprocable in said cylinder and having a piston rod extending through said bore, said piston and piston rod having a bore therethrough extending from the side of the piston nearer said first mentioned head through the opposite end of said piston rod, said casing providing a lubricant reservoir between the side of the piston nearer the second mentioned head and said second mentioned head, and means for delivering lubricant from said reservoir to motive fluid passing through said lubricator at a point between the opposite ends thereof.

MERVIN CHESTER HUFFMAN.

CERTIFICATE OF CORRECTION.

Patent No. 2,105,491.  January 18, 1938.

MERVIN CHESTER HUFFMAN.

It is hereby certified that error appears in the printed specification of the above numbered patent requiring correction as follows: Page 3, second column, line 59, claim 11, strike out the syllable, words and comma "ure fluid be flowing or static in said passage,"; line 60, same claim, after the comma following "passage" insert means for conducting lubricant at such pressure; page 4, second column, line 5, claim 19, after "cylinder" insert a comma; and that the said Letters Patent should be read with these corrections therein that the same may conform to the record of the case in the Patent Office.

Signed and sealed this 1st day of March, A. D. 1938.

(Seal)

Henry Van Arsdale,
Acting Commissioner of Patents.